(12) United States Patent
Melzer

(10) Patent No.: US 10,024,349 B2
(45) Date of Patent: Jul. 17, 2018

(54) OFFSET ANCHOR DEVICE

(71) Applicant: Hilti Aktiengesellschaft, Schaan (LI)

(72) Inventor: Lars Melzer, Hohenfurch (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/105,194

(22) PCT Filed: Dec. 15, 2014

(86) PCT No.: PCT/EP2014/077676
§ 371 (c)(1),
(2) Date: Jun. 16, 2016

(87) PCT Pub. No.: WO2015/091312
PCT Pub. Date: Jun. 25, 2015

(65) Prior Publication Data
US 2016/0312813 A1    Oct. 27, 2016

(30) Foreign Application Priority Data

Dec. 20, 2013  (EP) .................................... 13198880

(51) Int. Cl.
*F16B 35/00* (2006.01)
*F16B 13/12* (2006.01)

(52) U.S. Cl.
CPC .......... *F16B 13/128* (2013.01); *F16B 13/124* (2013.01); *F16B 35/00* (2013.01); *F16B 35/005* (2013.01)

(58) Field of Classification Search
CPC .... F16B 13/066; F16B 13/124; F16B 13/128; F16B 35/00; F16B 35/005

USPC ..................... 411/63, 71, 80.5, 388, 389, 393
See application file for complete search history.

(56) References Cited

U.S. PATENT DOCUMENTS

| | | | | |
|---|---|---|---|---|
| 906,112 | A | * 12/1908 | Crabtree | .................. E01B 9/02 |
| | | | | 232/39 |
| 1,057,217 | A | * 3/1913 | Bowman et al. | ..... F16B 35/042 |
| | | | | 411/389 |
| 2,019,513 | A | * 11/1935 | Stevenson | .............. B60G 11/12 |
| | | | | 267/264 |

(Continued)

FOREIGN PATENT DOCUMENTS

| CN | 201461651 | 5/2010 |
|---|---|---|
| CN | 102282378 | 12/2011 |

(Continued)

*Primary Examiner* — Roberta S Delisle
(74) *Attorney, Agent, or Firm* — Davidson, Davidson & Kappel, LLC

(57) ABSTRACT

An anchor device including an expansion section expandable when an expansion screw is screwed into the anchor device, and a tubular shank into which the expansion screw can be screwed. The anchor device has a joining device with an elongated offset element as well as a joining element. The first end of the offset element is connected to the tubular shank in such a way that the offset element extends essentially perpendicular to the tubular shank and to the expansion section. The second end of the offset element is connected to the first end of the joining element in such a way that the joining element extends essentially perpendicular to the offset element and essentially parallel to the tubular shank and to the expansion section.

9 Claims, 9 Drawing Sheets

(56) References Cited

U.S. PATENT DOCUMENTS

| | | | | |
|---|---|---|---|---|
| 2,879,660 | A * | 3/1959 | Reintjes | F23M 5/04 |
| | | | | 411/384 |
| 3,125,765 | A * | 3/1964 | Fay | E03D 11/06 |
| | | | | 285/148.27 |
| 3,213,576 | A * | 10/1965 | Davies | E04H 13/006 |
| | | | | 411/513 |
| 3,295,873 | A * | 1/1967 | Attwood | F16B 7/18 |
| | | | | 403/206 |
| 5,409,336 | A | 4/1995 | Jericevich et al. | |
| 5,909,920 | A * | 6/1999 | Dalinkiewicz | B62D 21/15 |
| | | | | 188/374 |
| 7,222,464 | B2 * | 5/2007 | Suehiro | F16B 5/02 |
| | | | | 411/82 |
| 7,475,518 | B2 * | 1/2009 | Suehiro | F16B 5/02 |
| | | | | 52/295 |
| 7,704,027 | B2 * | 4/2010 | Suehiro | F16B 5/02 |
| | | | | 411/388 |
| 2015/0010376 | A1 * | 1/2015 | Zach | C21D 9/0093 |
| | | | | 411/500 |

FOREIGN PATENT DOCUMENTS

| | | |
|---|---|---|
| CN | 103180619 | 6/2013 |
| DE | 201 06 520 | 8/2002 |

\* cited by examiner

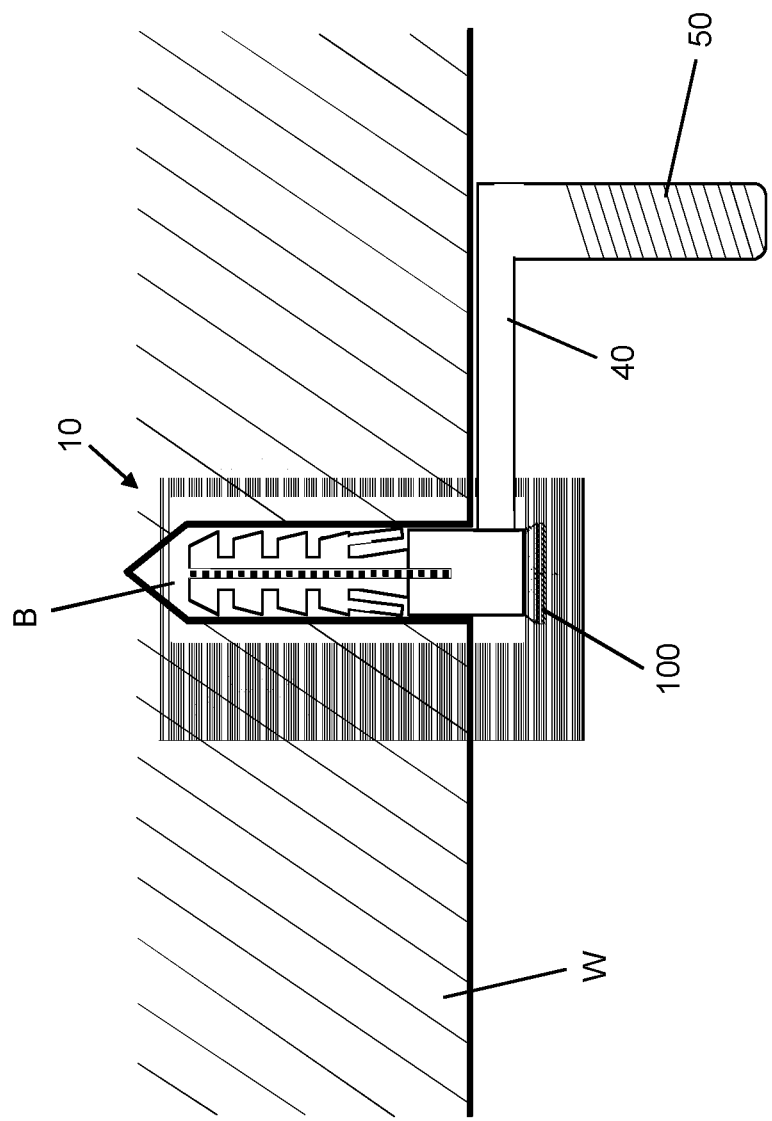

OFFSET ANCHOR DEVICE

The present invention relates to an anchor device comprising an expansion section that extends over part of the total length of the anchor device and that can be expanded when an expansion screw is screwed into the anchor device, and also comprising a tubular shank into which the expansion screw can be inserted.

BACKGROUND

An anchor device or an anchor (also referred to as a wall plug) is a component that is used in fastening technology and that is employed in various materials into which a screw cannot be directly screwed, unlike, for example, a wood screw into wood. The anchor is inserted as an intermediate part into a cylindrical hole in walls, ceilings or floors that are usually made of masonry or concrete or that are fitted with panels. Upon being screwed in, the wood screw or particleboard screw expands the anchor, thereby creating a positive fit—and to a lesser extent sometimes also a non-positive fit—between the anchor and the material surrounding it so that the anchor cannot be pulled out. A drill with hard-metal cutting edges (concrete drill) is employed to drill the hole in the hard material.

Such a conventional anchor is disclosed, for example, in German utility model DE 201 06 520. The anchor shown in this document of the state of the art has an expansion section that extends axially over part of the length of the anchor. This expansion section is expanded when an expansion screw is screwed into the anchor. The expanded and deformed anchor creates a positive connection between the screw and the wall of the drilled hole into which the anchor and subsequently the screw have been inserted. Owing to this positive connection between the screw that has been screwed into the anchor and the wall of the drilled hole, a high level of static friction is generated that holds the screw inside the drilled hole.

SUMMARY OF THE INVENTION

In spite of the relatively high static friction, however, it is still possible for the screw, along with the anchor, to be pulled back out of the drilled hole by correspondingly high tensile forces acting on the free end of the screw.

It is an objective of the present invention to provide an improved anchor device that can withstand even higher tensile loads or tensile forces.

The present invention provides an anchor device comprising an expansion section that extends over part of the total length of the anchor device and that can be expanded in that an expansion screw is screwed into the anchor device, and also comprising a tubular shank into which the expansion screw can be inserted.

According to the invention, a joining means is provided that has an elongated offset element as well as a joining element, whereby the elongated offset element has a first end as well as a second end, and the joining element has a first end as well as a second end, and whereby the first end of the offset element is connected to the tubular shank in such a way that the offset element extends essentially perpendicular to the tubular shank and to the expansion section, and whereby the second end of the offset element is connected to the first end of the joining element in such a way that the joining element extends essentially perpendicular to the offset element and essentially parallel to the tubular shank and to the expansion section. By means of the elongated offset element, which forms an eccentric (or non-concentric) arrangement of the expansion section relative to the joining element, the tensile forces being exerted on the free end of the screw no longer act along the center axis of the anchor device that is present in the material. As a result, the anchor device can withstand considerably higher tensile forces without being pulled out of the material in question.

For purposes of attaining a fast, effective and reversible connection between the tubular shank and the first end of the offset element, it can be advantageous according to another embodiment of the present invention for the joining means to have a tubular insertion shank which is situated at the first end of the offset element and in which the tubular shank can be accommodated in order to be joined to the offset element.

According to another advantageous embodiment of the present invention, it can be provided for the joining element to be configured in the form of a setscrew. The setscrew here can have an external and/or an internal thread. This makes it possible to reversibly connect components, devices and the like to the anchor device in a simple manner.

Alternatively, it is likewise possible for the joining element to be configured in any other suitable form of a connection element such as, for instance, a hook, a stud or the like.

BRIEF DESCRIPTION OF THE DRAWINGS

The present invention will be described in greater detail below with reference to advantageous embodiments, whereby the following is shown:

FIG. 9: a side view of the anchor device in a material, and a screw inside the anchor device.

DETAILED DESCRIPTION

Figure 1:
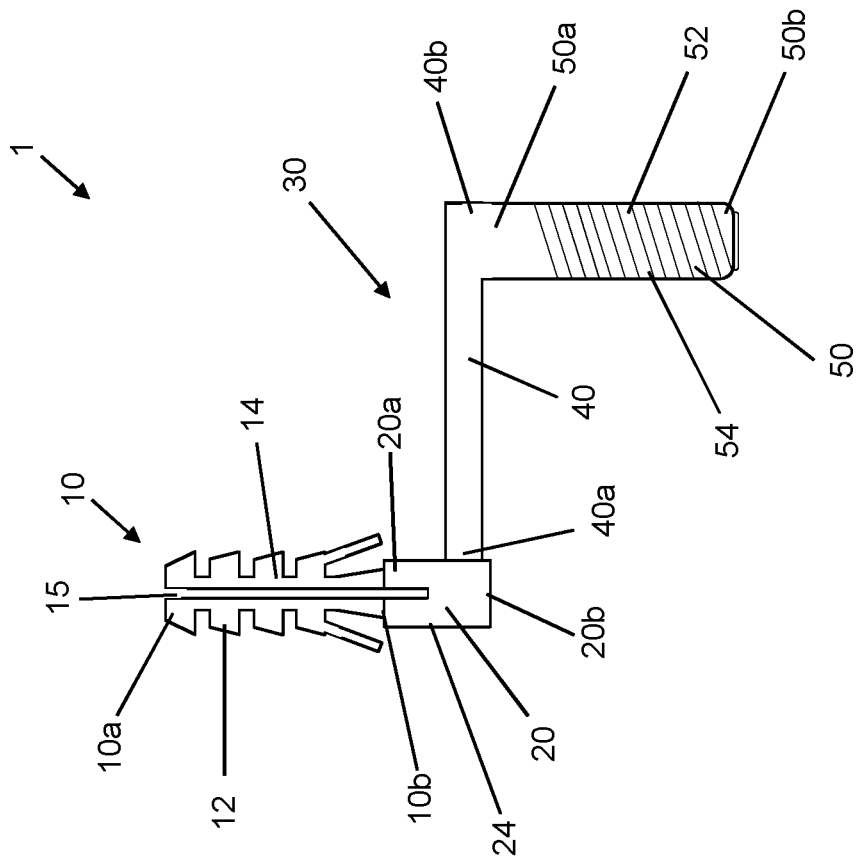
FIG. 1: a side view of an anchor device according to the invention, having an expansion section, a tubular shank as well as a joining means with an elongated offset element and with a joining element, in accordance with a first embodiment.
Figure 2:
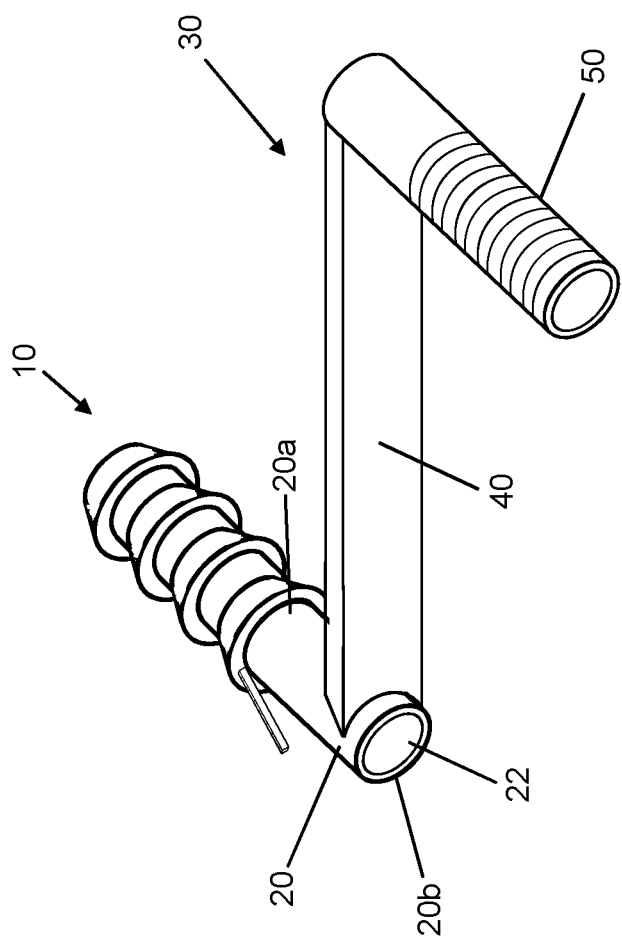
FIG. 2: a perspective bottom view of the anchor device, in accordance with the first embodiment.
Figure 3:
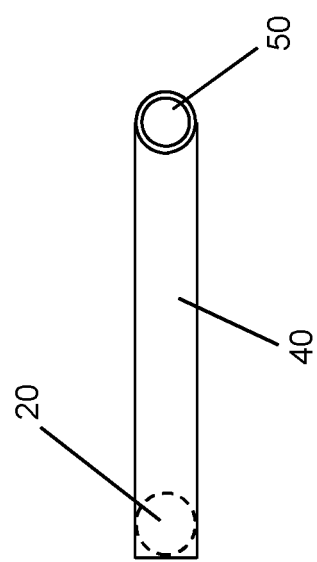
FIG. 3: a bottom view of the anchor device, in accordance with the first embodiment.
Figure 4:
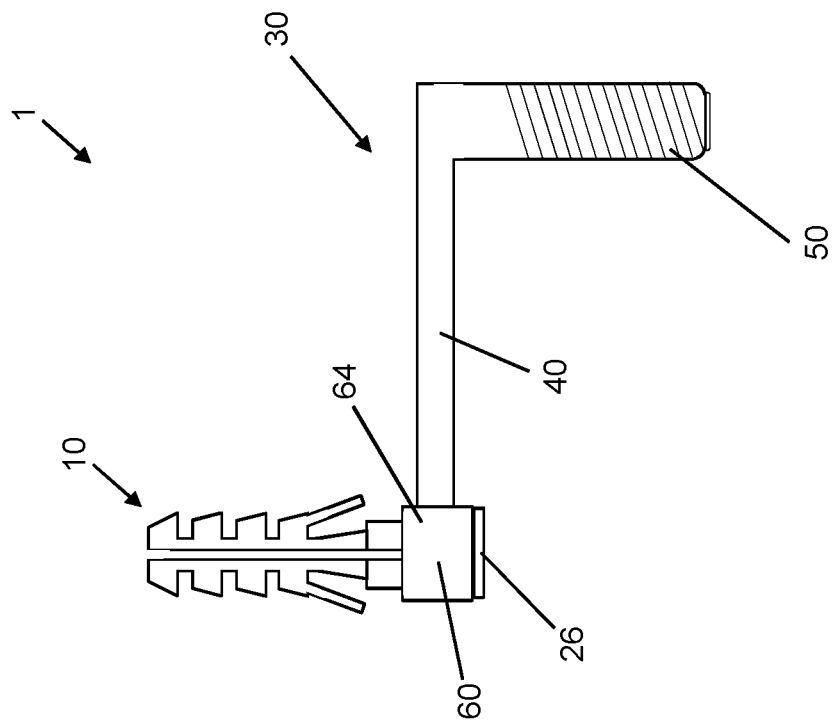
FIG. 4: a side view of an anchor device according to the invention, having an expansion section and a tubular shank, in accordance with a second embodiment.
Figure 5:
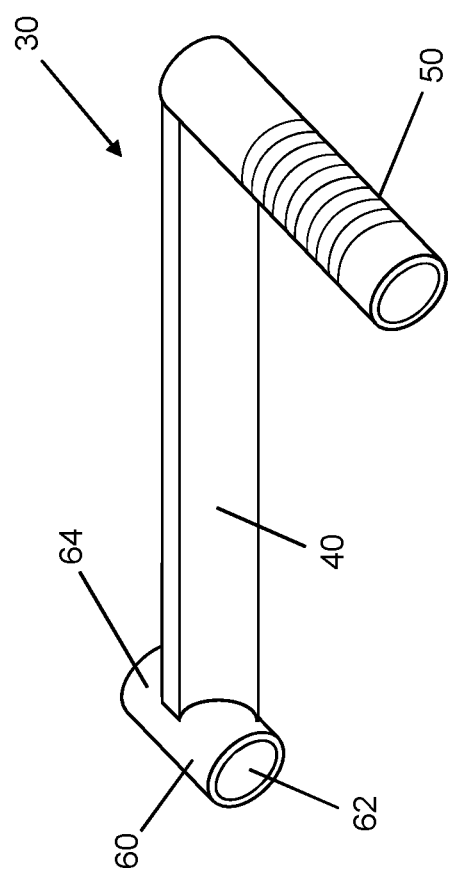
FIG. 5: a perspective bottom view of the joining means with the elongated offset element and with the joining element, in accordance with the second embodiment.
Figure 6:
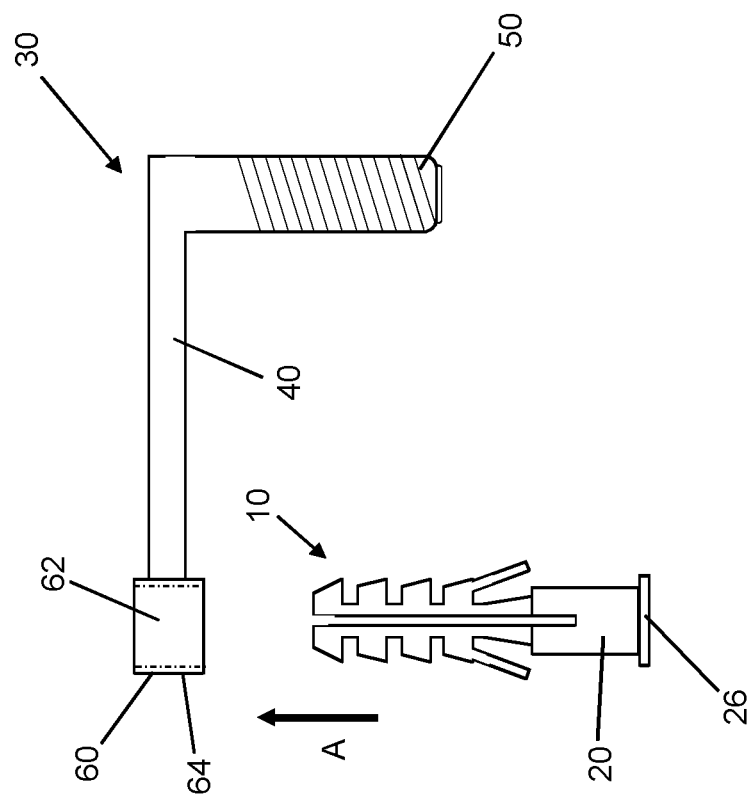
FIG. 6: a side view of the joining means with the elongated offset element and with the joining element as well as with the anchor device, in accordance with the second embodiment.
Figure 7:
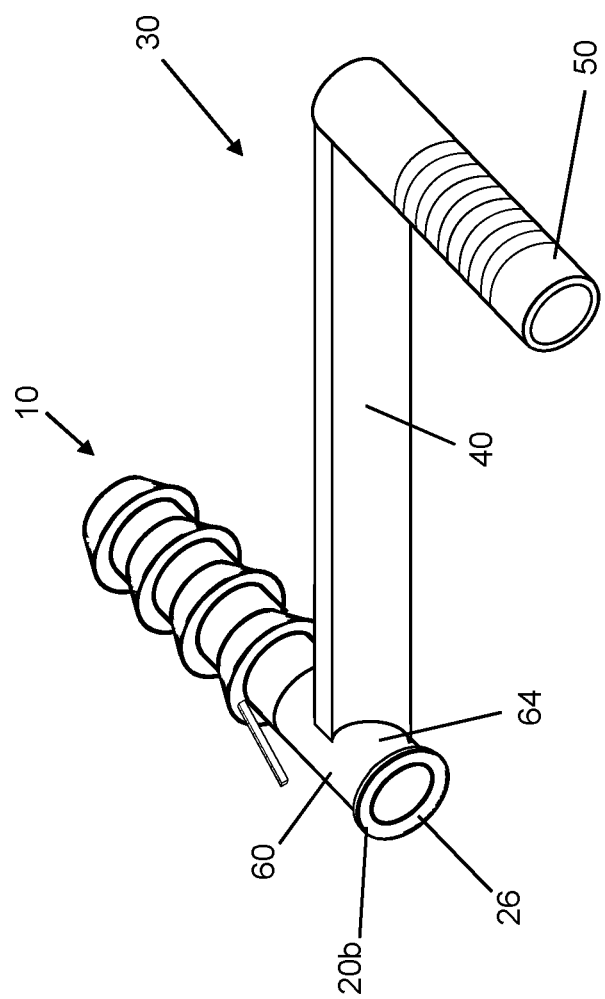
FIG. 7: a perspective bottom view of the joining means with the elongated offset element and with the joining element as well as with the anchor device, in accordance with the second embodiment.

FIGS. 1 to 3 show an anchor device 1 according to the invention, in accordance with a first embodiment.

The anchor device 1 serves to be inserted into a hole B that has previously been drilled into a material W such as, for instance, concrete, bricks or the like, in order to provide an adequate hold to a joining element 50 in the material W for an additional device or an additional component. The additional device or component is not shown in the figures. The anchor device 1 has an expansion section 10, a tubular shank 20 as well as a joining means 30.

Figure 8:
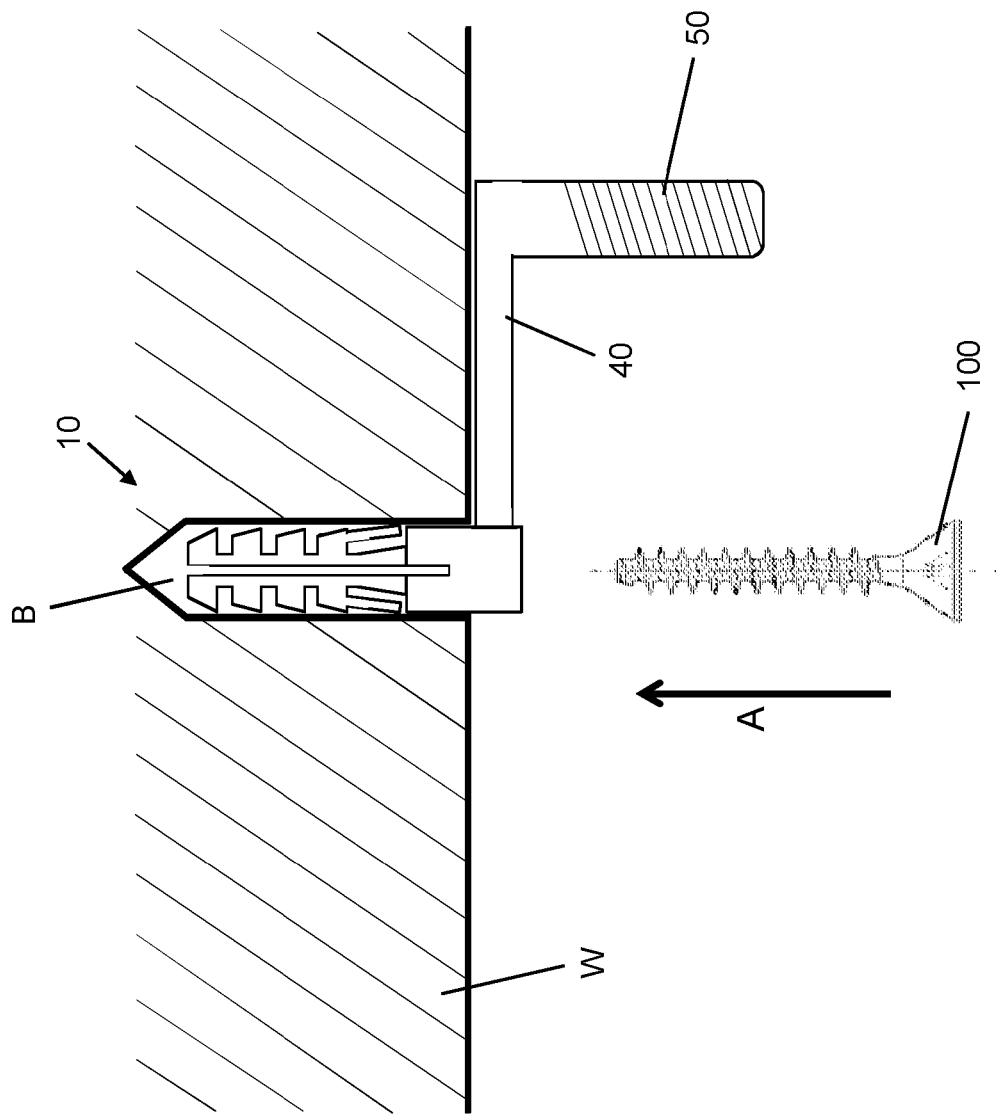
FIG. 8: a side view of the anchor device in a material, and a screw outside of the anchor device.

The expansion section 10 is made in one piece and it has a tubular front end 10a as well as a likewise tubular rear end 10b, whereby the inner diameter of the tubular front end 10a is smaller than the inner diameter of the tubular rear end 10b. The front end 10a is an insertion end of the anchor device 1 with which the anchor device 1 is inserted front first (in direction A) into the hole B that has been drilled into a material W (see FIGS. 8 and 9).

In the expansion section 10, the anchor device 1 has two expansion legs 12, 14 which extend in the lengthwise direction of the anchor and which are formed by two longitudinal slits 15 that extend from the front end 10a to the rear end 10b and that are each offset by 180° in the circumferential direction. The expansion section 10 is made of plastic. As an alternative, the expansion section 10 can also be made of any other suitable material.

The tubular shank 20 has a front end 20a as well as a rear end 20b. The front end 20a of the tubular shank 20 is firmly joined to the rear end 10b of the expansion section 10 and it has a cylindrical shape, with a cylindrical through-hole 22 (see FIG. 2). The tubular shank 20 is made of plastic. As an alternative, the tubular shank 20 can also be made of metal or of any other suitable material.

The joining means 30 has an offset element 40 in the form of an elongated shank 40 as well as a joining element 50.

The offset element 40 in the form of an elongated shank has a rectangular cross section and it has a first end 40a as well as a second end 40b. Alternatively, the cross section of the elongated shank 40 can also be round or have any other suitable shape. The first end 40a of the elongated shank 40 is joined by a bonded connection to the outer wall (circumferential surface) 24 of the tubular shank 20. The bonded connection can be in the form of an adhesive connection, a welded connection or the like.

The joining element 50 is in the form of a setscrew 52 having an external thread 54 and it has a first end 50a as well as a second end 50b.

The first end 50a of the joining element 50 is firmly joined to the second end 40b of the elongated shank 40. Another object (not shown here) can be screwed onto the external thread 54 of the second end 50b of the joining element 50. As an alternative, the joining element 50 can also be configured in the form of a hook.

FIGS. 4 to 7 show an anchor device 1 according to the invention, in accordance with a second embodiment. The anchor device 1 in accordance with the second embodiment is likewise intended to be inserted into a hole B that has previously been drilled into a material W such as, for instance, concrete, bricks or the like, in order to provide an adequate hold to a joining element 50 in the material W for an additional device or an additional component. According to the second embodiment, the anchor device 1 has an expansion section 10, a tubular shank 20 as well as a joining means 30.

The expansion section 10 is made in one piece and it has a tubular front end 10a as well as a likewise tubular rear end 10b, whereby the inner diameter of the tubular front end 10a is smaller than the inner diameter of the tubular rear end 10b.

In the expansion section 10, the anchor device 1 has two expansion legs 12, 14 which extend in the lengthwise direction of the anchor and which are formed by two longitudinal slits 15 that extend from the front end 10a to the rear end 10b and that are each offset by 180° in the circumferential direction. The expansion section 10 is made of plastic. As an alternative, the expansion section 10 can also be made of any other suitable material.

The tubular shank 20 has a front end 20a as well as a rear end 20b. The rear end 20b has a firmly attached edge element 26. The edge element 26 essentially has the shape of a flange and (as will be described in detail below) it serves as a stop limitation for the tubular shank 20 in the joining means 30. Moreover, the tubular shank 20 is firmly joined to the rear end 10b of the expansion section 10 and it has a cylindrical shape, with a cylindrical through-hole 22. The tubular shank 20 is made of one or more types of plastic. As an alternative, the tubular shank 20 can also be made of any other suitable material.

The rear end 10b of the expansion section 10 as well as the front end 20a of the tubular shank 20 are firmly joined together.

According to the second embodiment of the anchor device 1, the joining device 30 has a tubular insertion shank 60, an elongated shank 40 as well as a joining element 50.

The tubular insertion shank 60 has an essentially cylindrical shape, with a cylindrical through-hole 62. The through-hole 62 serves to receive the tubular shank 20. For this purpose, the diameter of the through-hole 62 is only negligibly greater than the diameter of the tubular shank 20, so that the expansion section 10 as well as the tubular shank 20 fit through the cylindrical through-hole 62 of the tubular insertion shank 60. The tubular shank 20 fits precisely in the through-hole 62 of the tubular insertion shank 60. The edge element 26 of the tubular shank 20 limits or holds the tubular shank 20 in the tubular insertion shank 60 (see FIGS. 4 and 6).

The elongated shank 40 according to the second embodiment essentially corresponds to that of the first embodiment. The first end of the elongated shank 40 is firmly joined to the outer wall (circumferential surface) 64 of the tubular insertion shank 60.

For purposes of attaching the expansion section 10 and the tubular shank 20 to the joining element 50 of the joining means 30, the expansion section 10 as well as the tubular shank 20 are inserted through the through-hole 62 of the tubular insertion shank 60. As already described above, the edge element 26 of the tubular shank 20 limits or holds the tubular shank 20 in the tubular insertion shank 60 (see FIGS. 4 and 6).

In order to fasten the expansion section 10 to a concrete or brick wall (material W), it is necessary to first drill a cylindrical hole B. The drilled hole B can be created in the material by means of a power drill, a hammer drill or the like (not shown here). In this process, the cross section of the drilled hole B essentially corresponds to the cross section of the expansion section 10 in the non-expanded state (see FIGS. 8 and 9). The diameter of the drilled hole B has to be slightly larger than the diameter of the tubular shank 20 as well as slightly larger than the expansion section 10 in the non-expanded state so that the expansion section 10 can be inserted into the drilled hole B.

Once the expansion section 10 of the anchor device has been positioned in the drilled hole B, an expansion screw 100 can be inserted into the cylindrical through-hole 22 of the tubular shank 20 and then positioned inside the expansion section 10. When the expansion screw 100 is screwed into the expansion section 10, the expansion legs 12, 14 are pushed outwards, as a result of which the expansion section 10 is deformed in such a way that a positive-fit connection is established between the expansion screw 100 and the wall of the drilled hole (material W). When the expansion section 10 is positioned in the drilled hole B and the expansion screw 100 is inserted into the expansion section 10, the elongated shank 40 of the joining element 50 is in contact with the wall of the concrete or brick wall. Now an object can be screwed onto the joining element 50.

Owing to the offset arrangement of the expansion section 10 and of the joining element 50, considerably higher forces can act upon the joining element 50 without the anchor device 1 being pulled out of the material W.

What is claimed is:

1. An anchor device comprising:
    an expansion section extending over part of a total length of the anchor device and expandable when an expansion screw is screwed into the anchor device;
    a tubular shank, the expansion screw insertable into the tubular shank; and
    a joining device having an elongated offset element as well as a joiner, the elongated offset element having a first end as well as a second end, and the joiner having a first end as well as a second end, the first end of the offset element being connected to the tubular shank in such a way that the offset element extends perpendicular to the tubular shank and to the expansion section, and the second end of the offset element is connected to the first end of the joiner in such a way that the joiner extends perpendicular to the offset element and parallel to the tubular shank and to the expansion section.

2. The anchor device as recited in claim 1 wherein the joining device has a tubular insertion shank situated at the first end of the offset element, the tubular shank accommodatable in the tubular insertion shank in order to be joined to the offset element.

3. The anchor device as recited in claim 2 wherein the expansion section is made of plastic.

4. The anchor device as recited in claim 2 wherein the expansion section has two longitudinal slits.

5. The anchor device as recited in claim 2 wherein the expansion section has two expansion legs.

6. The anchor device as recited in claim 2 further comprising the expansion screw attached to the expansion section.

7. The anchor device as recited in claim 2 wherein the offset element has a first side and a second side, the expansion section being situated on the first side and the joining device solely on the second side.

8. The anchor device as recited in claim 2 wherein the expansion element is placeable in a hole in an outer surface of a material, the offset element having a first side and a second side, the expansion element being situated on the first side, the first side for being outside the outer surface and facing the outer surface.

9. The anchor device as recited in claim 1 wherein the joiner is a setscrew.

* * * * *